United States Patent [19]
Shiery

[11] Patent Number: 5,288,112
[45] Date of Patent: Feb. 22, 1994

[54] HOSE FITTING

[75] Inventor: Jeffrey C. Shiery, Swanton, Ohio

[73] Assignee: Aeroquip Corporation, Maumee, Ohio

[21] Appl. No.: 992,167

[22] Filed: Dec. 17, 1992

[51] Int. Cl.$^5$ .............................................. F16L 33/207
[52] U.S. Cl. ..................................... 285/256; 285/259
[58] Field of Search ................ 285/256, 259, 238, 242

[56] References Cited

U.S. PATENT DOCUMENTS

| | | | |
|---|---|---|---|
| 2,319,586 | 5/1943 | Clench | 285/256 |
| 3,249,371 | 5/1966 | Peterman | 285/259 |
| 3,951,438 | 4/1976 | Scales | 285/256 |
| 4,106,526 | 8/1978 | Szentmihaly | 285/259 |
| 4,366,841 | 1/1983 | Currie et al. | 138/109 |
| 4,400,021 | 8/1983 | Duffield | 285/259 |
| 4,603,888 | 8/1986 | Goodall et al. | 285/259 |

FOREIGN PATENT DOCUMENTS 1220968  1/1971  United Kingdom ................ 285/256

Primary Examiner—Eric K. Nicholson
Attorney, Agent, or Firm—Emch, Schaffer, Schaub & Porcello Co.

[57] ABSTRACT

An improved hose fitting is disclosed. The hose fitting has a body member with a coupling nut at one end. A socket member surrounds the body member and together they define an opening for receiving a hose. A plurality of projections extend inwardly from the interior surface of the socket member. Each projection includes an inner side or surface, an outer side or surface and a tip surface connecting the inner surface and the outer surface. The tip surface extends a distance "x" from the interior surface of the socket member. An enlarged radius defines a circular outer surface on each projection. The radius is between 0.5x and 1.3x and is preferably approximately "x".

5 Claims, 1 Drawing Sheet

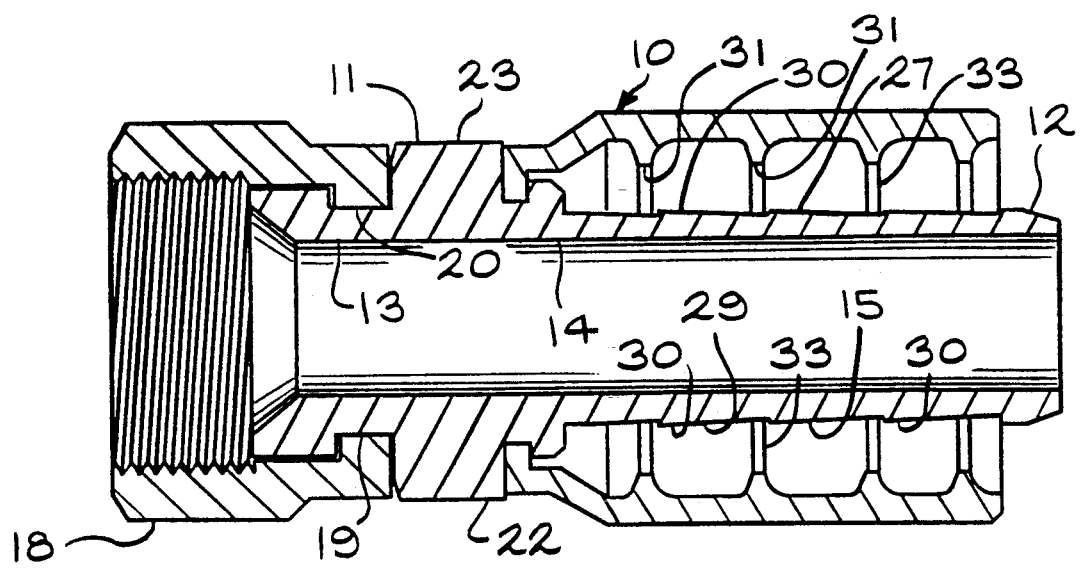
FIG. 1
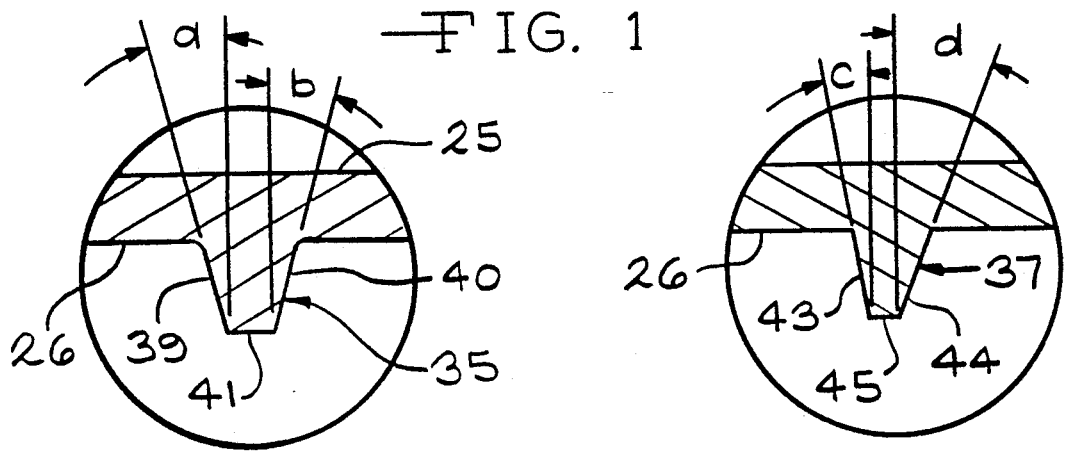
FIG. 2
(PRIOR ART)
FIG. 3
(PRIOR ART)
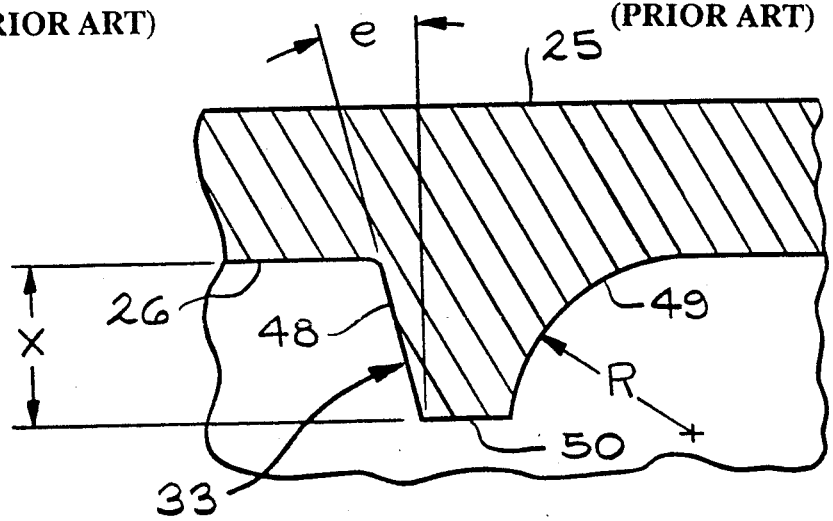
FIG. 4

HOSE FITTING

BACKGROUND OF THE INVENTION

This invention relates to an improved hose fitting which has a body member which is surrounded by a socket member. A generally cylindrical opening is defined between the socket member and the body member for the reception of a hose. The hose may be, for example, a reinforced hose having inner and outer layers of polymer material and one or more intermediate layers of reinforcement.

Normally the outer surface of the body member has a gripping surface including fins or the like which engage the interior of the hose. The socket member normally includes projections which extend inwardly and engage the outer surface of the hose. Often, the socket member is crimped so that the projections extend downwardly into the outer surface of the hose.

One example of a prior art hose fitting is shown in U.S. Pat. No. 4,366,841.

The present invention is specifically directed to an improved hose structure in which the projections on the socket member, which extend inwardly from the inner surface of the socket member, are of a design which reduce stress.

The projections include a large radius on the outer surface. The inventor believes that the large radius on the projection tends to transmit the forces generated by hose impulses throughout the entire socket member rather than only in the cross section of a particular projection or serration.

SUMMARY OF THE INVENTION

The present invention is directed to an improved hose fitting. The improved fitting includes a longitudinally extending body member having a hose end and a coupling end. A coupling nut is mounted adjacent the coupling end of the body member. The body member has an exterior surface which defines a gripping surface. The body member includes a longitudinally extending central opening. A socket member surrounds the body member and together with the body member defines a generally cylindrical opening for receiving a hose.

The interior surface of the socket member defines a serrated surface which comprises a plurality of projections. Each of the projections includes an inner side or surface, an outer side or surface and a tip surface joining the inner side and outer side. Each of the projections has a depth "x". The outer surface of the projection and the inner surface of the socket member define a relatively large circular surface having a radius of between 0.5x and 1.3x. The improved hose fitting, according to the present invention, tends to distribute forces throughout the socket member, thereby reducing the stresses found in many prior art hose fittings.

DESCRIPTION OF THE DRAWINGS

FIG. 1 is a cross-sectional view of an improved hose fitting, according to the present invention;

FIG. 2 is an enlarged view showing a projection found in a prior art hose fitting socket member;

FIG. 3 is a view similar to FIG. 2 showing still another prior art projection; and FIG. 4 is an enlarged cross-sectional view of the projection found in the improved hose fitting of FIG. 1.

DESCRIPTION OF THE PREFERRED EMBODIMENT

Referring to FIG. 1, a hose fitting, according to the present invention, is generally indicated by the reference number 10. Normally, the hose fitting 10 is constructed of metal. The hose fitting 10 includes a longitudinally extending body member 11 having a hose end 12 and coupling end 13. The body member 11 has a cylindrical interior opening 14 and an exterior surface 15. In this embodiment, a coupling nut 18 is rotatably mounted on the coupling end 13 of the body member 11. The body member 11 defines a groove 19 adjacent the coupling end 13. The coupling nut 18 includes a circular lip 20 which is received in the groove 19. The exterior surface 15 of the body member 11 also has a raised portion 22 which defines a plurality of wrench flats 23.

A socket member 25 surrounds and is connected to the body member 11. The socket member 25 defines an interior surface 26. The interior surface 26 of the socket member 25 and the exterior surface 15 of the body member 11 define a generally cylindrical opening 27 for the reception of a hose, for example, a reinforced hose (not shown).

The exterior surface 15 of the body member 11 defines a gripping surface 29. In the present embodiment, shown in FIG. 1, the gripping surface 29 comprises a plurality of angled shoulders or fins 30 which are engaged tightly with the hose after installation. The gripping surface 29 of the body member 11 may have various configurations and still fall within the scope of the present invention.

The interior surface 26 of the socket member 25 defines a serrated surface 31.

The serrated surface 31 in the present embodiment comprises a plurality of projections 33. The projections 33 in the FIG. 1 embodiment comprise annular spaced members. In other embodiments, not shown, the projection or projections comprise, for example, a continuous helical thread (not shown). The configurations of the projections 33 are an important part of the hose fitting 10, according to the present invention. Referring to FIG. 2, a typical prior art projection 35 is shown. FIG. 3 shows a projection 37 of the type disclosed in prior art U.S. Pat. No. 4,366,841. Referring to FIG. 2, the prior art projection 35 extends inwardly from an interior surface 26 of a socket member 25. The prior art projection 35 includes an inner side 39, an outer side 40 and a tip surface 41 joining the inner side 39 and the outer side 40.

The inner side 39 and outer side 40 define angles a and b with respect to the vertical. The angles a and b are normally equal to one another and are often approximately 15°.

The prior art projection 37, shown in FIG. 3, includes an inner side 43, an outer side 44 and a tip surface 45 joining the inner side 43 and outer side 44. The inner side 43 defines an angle c with respect to the vertical while the outer side 44 defines an angle d with respect to the vertical. The angle c is 10° or less, with 3° being suggested. The angle d is a greater angle of 20°.

Referring to FIG. 4, a projection 33, according to the present invention, is shown. The projection 33 includes an inner side or surface 48, an outer side or surface 49 and a tip surface 50 joining the inner side 48 and the outer side 49.

The inner side 48 defines an angle e with respect to the vertical. In the present embodiment shown in FIG.

4, the angle is approximately 10°. However, the angle e may vary from between approximately 5° and 15°. The tip surface 50 extends a distance "x" from the interior surface 26 of the socket member 25. In the present embodiment, the distance "x" is approximately 3 mm.

An important feature of the present invention, is that the outer side or outer surface 49 of the projection 33 defines a surface having a radius "R" of between 0.5x and 1.3x. In the preferred embodiment, shown in FIG. 4, the radius equals x. As noted above, in the embodiment illustrated in FIG. 4, x is equal to 3 mm. It has been found that by providing the large radius R, the stress resulting from impulse forces within the hose which is transferred to the projection 33 is significantly reduced. This results in an improved hose fitting 10.

In addition, the large radius strengthens the projection 33 and the projection 33 does not have a tendency to bend as is the case in some prior art projections, such as the projection 33 shown in FIG. 3.

Many modifications and revisions may be made to the hose fitting 10 described above without departing from the scope of the invention or from the following claims.

We claim:

1. A hose fitting for use with a hose comprising, in combination, a longitudinally extending body member having a hose end and a coupling end, said body member having an exterior surface and an interior opening, said exterior surface defining a gripping surface and a socket member surrounding said body member, said socket member defining an interior surface, said socket member interior surface and said exterior surface of said body member defining a generally cylindrical opening for receiving a hose, said interior surface of said socket member defining a serrated surface comprising a plurality of projections, each of said projections including an inner side, an outer side and a tip surface, each of said projections having a depth "x" perpendicularly measured from said interior surface of said socket member to said tip surface, said inner side defining a straight surface having an angle with respect to the vertical of from about 5° to about 15°, said outer side of said projection and said interior surface of said socket member defining a circular surface having a radius of between 0.5x and 1.3x.

2. A hose fitting, according to claim 1, wherein said projections comprise a plurality of annular, spaced projections.

3. A host fitting, according to claim 1, wherein said circular surface has a radius of x.

4. A hose fitting, according to claim 1, wherein a coupling nut is mounted on said coupling end of said body member.

5. A hose fitting for use with a hose comprising, in combination, a longitudinally extending body member having a hose end and a coupling end, a coupling nut mounted adjacent said coupling end of said body member, said body member having an exterior surface and an interior opening, said exterior surface defining a gripping surface and a socket member surrounding said body member, said socket member defining an interior surface, said socket member interior surface and said exterior surface of said body member defining a generally cylindrical opening for receiving a hose, said interior surface of said socket member defining a serrated surface comprising a plurality of projections, each of said projections including an inner surface, an outer surface and a tip surface, each of said projections having a depth "x" perpendicularly measured from said interior surface of said socket member to said tip surface, said inner side defining a straight surface having an angle with respect to the vertical of from about 5° to about 15°, said outer surface of said projection and said interior surface of said socket member defining a circular surface having a radius of approximately x.

* * * * *